US012670611B2

(12) United States Patent (10) Patent No.: US 12,670,611 B2
Moss (45) Date of Patent: Jun. 30, 2026

(54) AIRCRAFT STEERING ANGLE DETERMINATION

(71) Applicant: AIRBUS OPERATIONS LIMITED, Bristol (GB)

(72) Inventor: Ethan Moss, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 580 days.

(21) Appl. No.: 18/115,296

(22) Filed: Feb. 28, 2023

(65) Prior Publication Data

US 2023/0274458 A1 Aug. 31, 2023

(30) Foreign Application Priority Data

Feb. 28, 2022 (GB) ..................................... 2202766

(51) Int. Cl.
| | |
|---|---|
| *G06T 7/73* | (2017.01) |
| *G01B 11/26* | (2006.01) |
| *G06T 7/12* | (2017.01) |
| *G06T 7/194* | (2017.01) |
| *G06T 7/60* | (2017.01) |

(52) U.S. Cl.
CPC ................ *G06T 7/73* (2017.01); *G01B 11/26* (2013.01); *G06T 7/12* (2017.01); *G06T 7/194* (2017.01); *G06T 7/60* (2013.01); *G06T 2207/20061* (2013.01)

(58) Field of Classification Search
CPC .. G06T 7/73; G06T 7/12; G06T 7/194; G06T 7/60; G06T 2207/20061; G06T 2207/10024; G06T 2207/30164; G06T 7/74; G06T 7/11; G06T 7/13; G06T 7/136; G06T 7/90; G06T 2207/10016; G06T 7/75; G01B 11/26; B64C 25/34; B64D 45/0005
See application file for complete search history.

(56) References Cited

U.S. PATENT DOCUMENTS

| | | | |
|---|---|---|---|
| 6,404,486 B1 | 6/2002 | Nobis et al. | |
| 6,405,975 B1 | 6/2002 | Sankrithi et al. | |
| 6,722,610 B1 * | 4/2004 | Rawdon | B64C 25/50 |
| | | | 244/103 W |

(Continued)

FOREIGN PATENT DOCUMENTS

| | | |
|---|---|---|
| CN | 110838247 | 2/2020 |
| EP | 3 543 086 A1 | 9/2019 |

(Continued)

OTHER PUBLICATIONS

European Search Report cited in EP Application No. 23 158 967.2 mailed May 22, 2024, 7 pages.

(Continued)

*Primary Examiner* — Chan S Park
*Assistant Examiner* — Daniel C Chang
(74) *Attorney, Agent, or Firm* — Nixon & Vanderhye P.C.

(57) ABSTRACT

A method of determining a steering angle of an aircraft landing gear including: obtaining an image of the aircraft landing gear; performing edge detection on the image; determining, based at least in part on an edge obtained by the edge detection, a relative position of a component of the aircraft landing gear; and determining, based at least in part on the relative position of the component, the steering angle of the aircraft landing gear.

21 Claims, 8 Drawing Sheets

(56) References Cited

U.S. PATENT DOCUMENTS

| | | | |
|---|---|---|---|
| 6,961,445 B1 | 11/2005 | Jensen et al. | |
| 8,042,765 B1 | 10/2011 | Nance | |
| 8,712,603 B2 | 4/2014 | Cox et al. | |
| 9,047,771 B1* | 6/2015 | Thoreen | G01C 23/00 |
| 9,786,042 B2 | 10/2017 | Venkatesha et al. | |
| 10,317,533 B2 | 6/2019 | Cherepinsky | |
| 10,365,094 B2 | 7/2019 | Arora et al. | |
| 11,010,889 B2 | 5/2021 | Finch et al. | |
| 2008/0285858 A1* | 11/2008 | Weismuller | G06V 10/443 |
| | | | 382/215 |
| 2015/0002620 A1 | 1/2015 | Shin et al. | |
| 2016/0216128 A1 | 7/2016 | Takano et al. | |
| 2017/0334578 A1* | 11/2017 | Fleck | B64D 47/08 |
| 2018/0224868 A1* | 8/2018 | Lim | G01S 13/882 |
| 2019/0112070 A1* | 4/2019 | Fink | G01P 3/56 |
| 2020/0070960 A1 | 3/2020 | Parker | |
| 2020/0160736 A1 | 5/2020 | Moll | |
| 2020/0398975 A1* | 12/2020 | Toda | B64C 25/36 |
| 2021/0020058 A1* | 1/2021 | Moll | B64D 45/08 |
| 2021/0042893 A1* | 2/2021 | Yelton | H04N 13/204 |
| 2021/0114657 A1 | 4/2021 | Lu et al. | |
| 2021/0276700 A1* | 9/2021 | Xie | G03B 15/006 |
| 2021/0407129 A1 | 12/2021 | Durand et al. | |
| 2022/0099531 A1 | 3/2022 | Fanton et al. | |
| 2022/0135213 A1* | 5/2022 | Kerr | B64C 25/26 |
| | | | 244/102 A |
| 2022/0379332 A1* | 12/2022 | Paolozzi | B05B 12/124 |
| 2023/0094156 A1* | 3/2023 | Au | G06V 10/469 |
| | | | 701/3 |
| 2024/0043141 A1* | 2/2024 | Hashimoto | B64D 47/08 |

FOREIGN PATENT DOCUMENTS

| | | | |
|---|---|---|---|
| EP | 4 156 121 | 3/2023 | |
| GB | 2587416 A | 3/2021 | |
| WO | WO-2014127607 A1 * | 8/2014 | G08G 5/54 |
| WO | 2020/169833 | 8/2020 | |

OTHER PUBLICATIONS

Tian Shu et al., "Image Processing-Based Wheel Steer Angle Detection", Journal of Electronic Imaging 22(4), 043005 (Oct.-Dec. 2013), 10 pages.

Joy Au, et al., "Challenges and Opportunities of Computer Vision Applications in Aircraft Landing Gear", 2022 IEEE Aerospace Conference (AERO), Mar. 5, 2022, 10 pages.

European Search Report cited in EP 23158973.0 mailed Aug. 11, 2023, 12 pages.

Combined Search and Examination Report under Section 17 and 18(3) mailed Aug. 22, 2022 in GB application GB2202766.8, 5 pages.

Wang et al., "The study on tire tread depth measurement method based on machine vision", Advances in Mechanical Engineering, vol. 11, No. 4, Feb. 19, 2019, pp. 1-12.

Huang et al., "Measurement of Tire Tread Depth with Image Triangulation", Computer Science, 2016 International Symposium on Computer, Consumer and Control (IS3C), Jul. 4, 2016, 3 pages.

U.S. Appl. No. 18/115,296, Office Action (Jul. 30, 2025)(35 Pages).

* cited by examiner

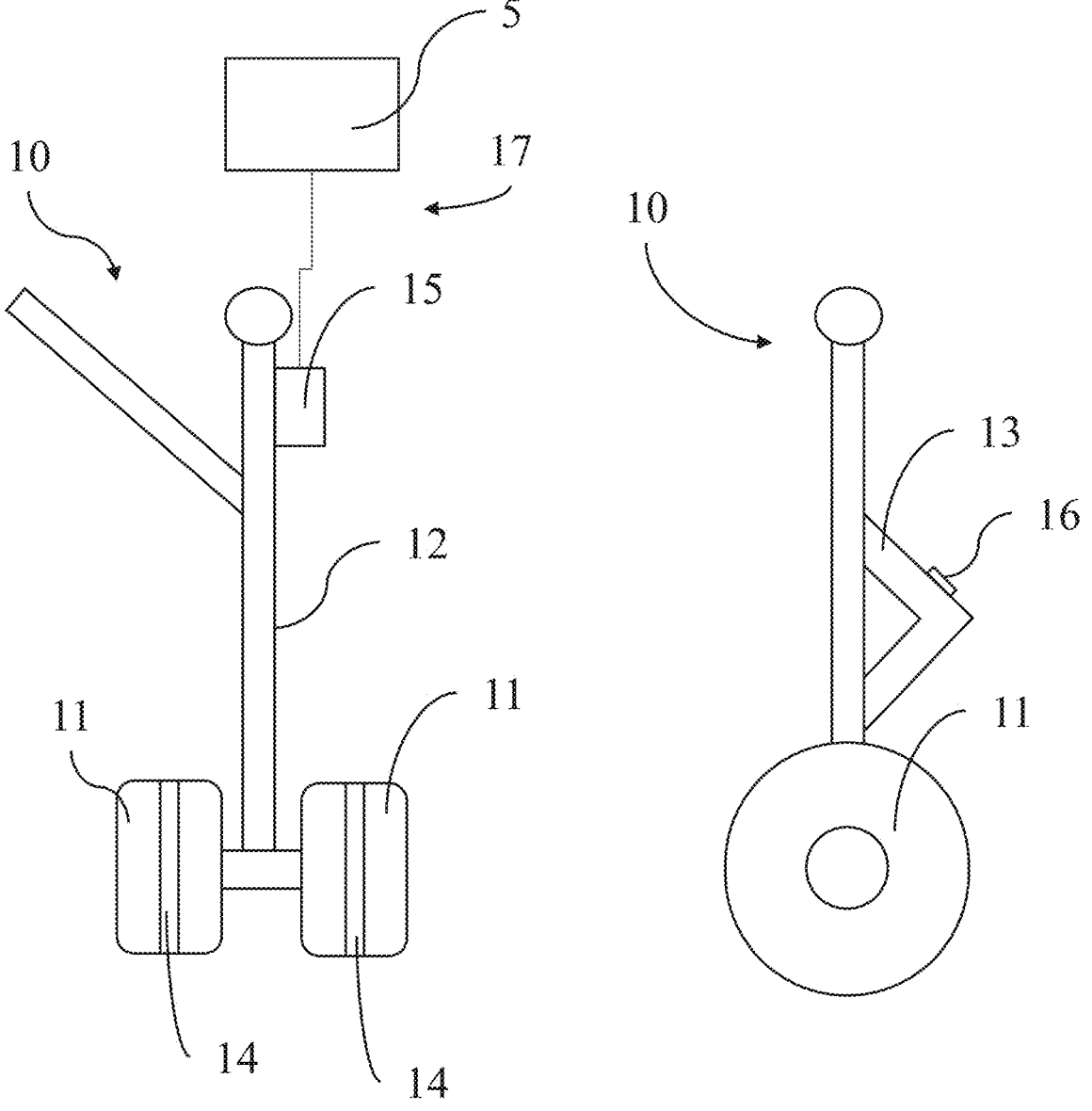
Figure 2                    Figure 3

100

101 Obtaining an image

102 Performing image pre-processing

103 Determining a region of disinterest

104 Applying a mask

105 Applying a threshold

106 Determining a region of interest

107 Performing edge detection

108 Determining a relative position

109 Determining the steering angle

110 Providing information

20

12

21

20

AIRCRAFT STEERING ANGLE DETERMINATION

RELATED APPLICATION

This application incorporates by reference and claims priority to United Kingdom patent application GB 2202766.8, filed Feb. 28, 2022.

TECHNICAL FIELD

The present invention relates to a method of determining a steering angle of an aircraft landing gear, an aircraft controller, a system for determining a steering angle of an aircraft landing gear, a non-transitory computer-readable storage medium and an aircraft.

BACKGROUND

During operation of an aircraft, it may be desirable for a pilot to receive feedback relating to a status of the aircraft or components thereof. This may allow the pilot to make decisions and/or take actions dependent on the status.

SUMMARY

According to a first aspect of the present invention, there is provided a method of determining a steering angle of an aircraft landing gear, the method comprising: obtaining an image of the aircraft landing gear; performing edge detection on the image; determining, based at least in part on an edge obtained by the edge detection, a relative position of a component of the aircraft landing gear; and determining, based at least in part on the relative position of the component, the steering angle of the aircraft landing gear.

The steering angle or information related to the steering angle may be fed back to a pilot to assist in manoeuvring an aircraft. For example, when taxiing, the pilot may be informed of the steering angle of the landing gear so as to know how the aircraft is going to move, and/or so as to know whether the landing gear is responding appropriately to a steering command. Using edge detection to determine the steering angle from an image may enable the steering angle to be determined without any physical interaction with the aircraft landing gear.

Optionally, the relative position of the component may comprise a position determined relative to a further component of the aircraft landing gear. For example, the position of the component may be determined relative to a fixed component of the aircraft landing gear, e.g. a strut of the aircraft landing gear. Optionally, the position of the component may be determined relative to a part of an aircraft separate to the aircraft landing gear. For example, the position of the component may be determined relative to a part of a landing gear bay, e.g. a door of the landing gear bay.

Optionally, the method comprises obtaining the image of the aircraft landing gear using an imaging device. In this way, the steering angle of the aircraft landing gear may be determined in a non-intrusive manner.

Optionally, determining the relative position of the component comprises determining, based at least in part on the edge obtained by the edge detection, a position of the component of the aircraft landing gear relative to the at least one imaging device. In such a case, the position of the imaging device may be fixed relative to a component of the aircraft landing gear which does not move when the steering angle is changed. As such, the position of the imaging element may be known and constant which may help to increase consistency of steering angle measurements.

Optionally, the at least one imaging device may be used for other purposes in addition to determining the steering angle. This may reduce the total number of sensors/devices within an aircraft landing gear or aircraft landing gear bay. For example, the imaging device may be used for determining a rate of extension and/or retraction of the landing gear, and/or for monitoring the landing gear bay for the presence of foreign objects.

Optionally, the aircraft landing gear is a main landing gear. Optionally, the aircraft landing gear is a nose landing gear. Optionally, the aircraft landing gear is a body landing gear.

Optionally, performing edge detection comprises performing Canny edge detection. Canny edge detection may reduce the amount of data needing to be processed over other edge detection processes.

Optionally, the method comprises determining a region of disinterest of the image, the region of disinterest comprising part of the image in which the component is not expected to be present in normal operation, and applying a mask to the image to remove the region of disinterest from the image.

Applying a mask to the image to remove the region of disinterest may allow background noise and any static components to be removed from the image. The region of disinterest may include an area in which it is not possible for the component to be, e.g. due to the presence of other static components.

Optionally, the method comprises performing the edge detection after applying the mask to the image.

Removing the region of disinterest from the image may help to reduce the computational power required to determine the steering angle. For example, as only a smaller sub-section of the image is analysed. This may help to speed up the determination of the steering angle, which may increase the efficiency of the method.

Optionally, the region of disinterest may be constant for a given aircraft type. Optionally, information indicative of the region of disinterest may be stored in a memory on the aircraft.

In this way, the information indicative of the region of disinterest may be easily and quickly accessed, which may help to speed up the determination of the steering angle. This may increase the efficiency of the method.

Optionally, the region of disinterest is determined by analysing a series of images of the aircraft landing gear and determining which parts of the image do not vary significantly between images in the series of images. For example, a pixel within one image of the series of images with a property which does not vary by more than a threshold amount between sequential images may be determined to be part of the region of disinterest. The lack of variation in the property of the pixel may be indicative of that part of the image showing a stationary component. The property may comprise a brightness and/or colour of the pixel. The threshold amount may very between aircraft types and may also be dependent on factors such as lighting conditions.

In this way, the region of disinterest may be adjusted to the current aircraft/aircraft landing gear and may take into account changing conditions. For example, the region of disinterest may change as parts of the aircraft landing gear wear. This may result in a more accurate determination of the region of disinterest.

Optionally, the method comprises: determining a region of interest of the image, the region of interest comprising part of the image in which the component is located; and selecting a portion of the region of interest; wherein the performing edge detection on the image comprises performing edge detection on only the portion of the region of interest.

By performing edge detection on only the portion of the region of interest where the component is located, the computational power required for the method may be reduced. This may help to improve the efficiency of the method.

Optionally, the method comprises performing contour detection on the image to determine the region of interest. Contour detection may enable the location of the component in the image, and therefore the region of interest, to be more quickly determined. This may help to increase the efficiency of the method.

Optionally, the component of the aircraft landing gear comprises a tyre. The relative position of the tyre, or a part of the tyre, may be directly related to the steering angle of the aircraft landing gear. As such, the relative position of the tyre may provide a more accurate representation of the steering angle of the aircraft landing gear.

Optionally, the tyre comprises a tread, and the method comprises determining, based at least in part on the edge obtained by the edge detection, a relative angle of the tread and determining, based at least in part on the relative angle of the tread, the steering angle of the aircraft landing gear.

The tread of the tyre may provide a uniform reference point which is indicative of the steering angle of the landing gear. The tread may also be common between different aircraft types, allowing the same method to be used across different aircraft types.

Optionally, the tyre comprises multiple treads. Optionally, the component comprises multiple tyres, each comprising one or more treads.

Optionally, the relative angle of the tread may comprise an angle determined relative to a further component of the aircraft landing gear. For example, the angle of the tread may be determined relative to a fixed component of the aircraft landing gear, e.g. a strut of the aircraft landing gear. Optionally, the angle of the tread may be determined relative to a part of an aircraft separate to the aircraft landing gear. For example, the angle of the tread may be determined relative to a part of a landing gear bay, e.g. a door of the landing gear bay.

Optionally, where the method comprises capturing the image of the aircraft landing gear using an imaging device, the method comprises determining, based at least in part on the edge obtained by the edge detection, the angle of the tread relative to the imaging device.

Optionally, the method comprises determining the relative position of the component of the aircraft landing gear by applying a Hough transform to the edge obtained by the edge detection.

The Hough transform may determine straight lines within the image which are indicative of the tread of the tyre. Optionally, the relative angle of the tread is determined using the Hough transform.

Optionally, the Hough transform generates multiple lines indicative of the tread of the tyre. Optionally, the method comprises determining a central tendency of the generated lines. Optionally, the method comprises taking a median, a mean and/or a mode of the relative angles of the generated lines.

Optionally, the method comprises applying a filter to greyscale the image. Converting the image to greyscale may help with subsequent image processing steps, such as contour detection. For example, a grayscale image allows for the creation of a binary image following thresholding. Optionally, the applying the filter to greyscale the image occurs before performing edge detection of the image. Optionally, the applying the filer to greyscale the image occurs before performing contour detection.

Optionally, the method comprises applying a threshold to the image. The threshold may change pixels of the image to make the image easier to subsequently analyse.

Optionally, the threshold may comprise an adaptive threshold. For example, the adaptive threshold may comprise Mean or Gaussian thresholding. Optionally, the threshold may comprise Otsu thresholding. Optionally, the applying the threshold to the image occurs after applying the filter to greyscale the image.

Applying a threshold to the image may help to account for inconsistent lighting in the image. This may help to improve the consistency of the method irrespective of lighting conditions.

Optionally, the method comprises applying brightness and/or contrast manipulation to the image. Optionally, the applying brightness and/or contrast manipulation to the image comprises applying gamma correction to the image. This may help to improve the consistency of gamma levels between the input image and the plurality of reference images. This may help to increase the accuracy of the comparison of the input image against the plurality of reference images.

Optionally, the component comprises a reference mark, and the determining the relative position of the component comprises determining, based at least in part on the edge obtained by the edge detection, a relative position of the reference mark.

Optionally, the component is a torque link and the torque link comprises the reference mark. Optionally, the component comprises a plurality of reference marks.

The reference mark may help in determining the position of the component relative the imaging device. For example, the reference mark may be less susceptible to external influence than the component as a whole, e.g. it may be less likely that an external force moves the reference mark in an undesirable/inconsistent way. Therefore, the reference mark may provide a more consistent reference point for determining the position of the component.

Furthermore, the reference mark may be arranged such that it is not occluded from the imaging device, even when the component to which it is attached is at least partially occluded from the imaging device. This may allow the position of the component to be determined even when the component is occluded.

Optionally, the method comprises providing information indicative of the steering angle of the aircraft landing gear to a crew of an aircraft. Optionally, the method comprises displaying the steering angle of the aircraft landing gear in a cockpit of the aircraft.

This may allow the pilot and/or other member of the crew to be quickly and easily informed of the steering angle of the landing gear of the aircraft. The pilot may be informed of the steering angle of the aircraft landing gear even if the aircraft landing gear is not in their direct sight. This may help the pilot with manoeuvring the aircraft on the ground.

Moreover, the determined steering angle of the aircraft landing gear may be used to limit further movement/rotation of the aircraft landing gear. For example, if the steering angle of the aircraft landing gear is determined to be at a maximum safe steering angle, the pilot may be prevented from increasing the steering angle further. The pilot may also receive a warning or other feedback when the maximum steering angle is reached.

Optionally, the method comprises providing information indicative of the steering angle of the aircraft landing gear to the crew of the aircraft while not on the ground.

This information may be used to determine whether the aircraft landing gear is in the correct position/orientation for landing and/or cruise. The aircraft may carry out a pre-land test in which the aircraft landing gear is actuated to turn in the landing gear bay to ensure that it is operating correctly before being extended. The method may comprise provide information indicative of the angle of the aircraft landing gear in the landing gear bay which can be used confirm whether the aircraft landing gear is operating correctly. This may allow the crew to make an informed decision on whether it is safe to continue with landing and/or continued flight.

Optionally, the method comprises storing the determined steering angle. Optionally, the method comprises storing the determined steering angle on a memory of the aircraft. Optionally, the method comprises storing the determined steering angle on a database accessible by the aircraft.

According to a second aspect of the present invention, there is provided an aircraft controller configured to: obtain an image of an aircraft landing gear; perform edge detection on the image; determine, based at least in part on an edge obtained by the edge detection, a relative position of a component of the aircraft landing gear; determine, based at least in part on the relative position of the component, the steering angle of the aircraft landing gear.

Optionally, the controller is configured to receive the image from an imaging device. Optionally, the controller and the imaging device are provided as a single unit. In this way, image processing may occur locally in the single unit without the image being transmitted away from the single unit. This may help to make it easier for the aircraft controller and the imaging device to be retrofit to existing aircraft.

According to a third aspect of the present invention, there is provided a system for determining a steering angle of an aircraft landing gear, the system comprising: an imaging device; and an aircraft controller configured to: obtain an image of the aircraft landing gear from the at least one imaging device; perform edge detection on the image; determine, based at least in part on an edge obtained by the edge detection, a relative position of a component of the aircraft landing gear; determine, based at least in part on the relative position of the component, the steering angle of the aircraft landing gear.

Optionally, the imaging device comprises a first imaging device and a second imaging device, wherein the first imaging device and the second imaging device are different types of imaging device.

This may help to increase the robustness of the system as the first and second imaging devices may comprise different failure conditions. For example, a situation that may cause the first imaging device to fail to operate correctly may not have the same effect on the second imaging device.

Optionally, the first imaging device comprises a camera and the second imaging device comprises a lidar sensor.

Optionally, the first imaging device comprises a first sensor and the second imaging device comprises a second sensor. Optionally, the first sensor is a camera sensor and the second sensor is a lidar sensor.

Providing different types of imaging device may allow for different types of data to be captured. For example, a lidar sensor may provide depth information of the image captured.

According to a fourth aspect of the present invention, there is provided a method of identifying an aircraft steering angle, the method comprising: obtaining an image of an aircraft landing gear assembly; performing image processing on the image to determine an image feature, the image feature associated with a first aircraft component; identifying, based at least in part on the image feature, a position of the first component of the assembly relative to a second component of the assembly; and identifying, based at least in part on the identified position, the aircraft steering angle.

According to a fifth aspect of the present invention, there is provided a non-transitory computer-readable storage medium storing instructions that, when executed by an aircraft controller, cause the aircraft controller to carry out the method according the first aspect of the present invention or the fourth aspect of the present invention.

According to a sixth aspect of the present invention, there is provided an aircraft comprising the controller according to the second aspect of the present invention, the system according to the third aspect of the present invention, or the non-transitory computer-readable storage medium according to the fifth aspect of the present invention.

BRIEF DESCRIPTION OF THE DRAWINGS

Embodiments of the invention will now be described, by way of example only, with reference to the accompanying drawings, in which:

FIGS. 2 and 3 show schematic views of an aircraft landing gear;

DETAILED DESCRIPTION

Figure 1:
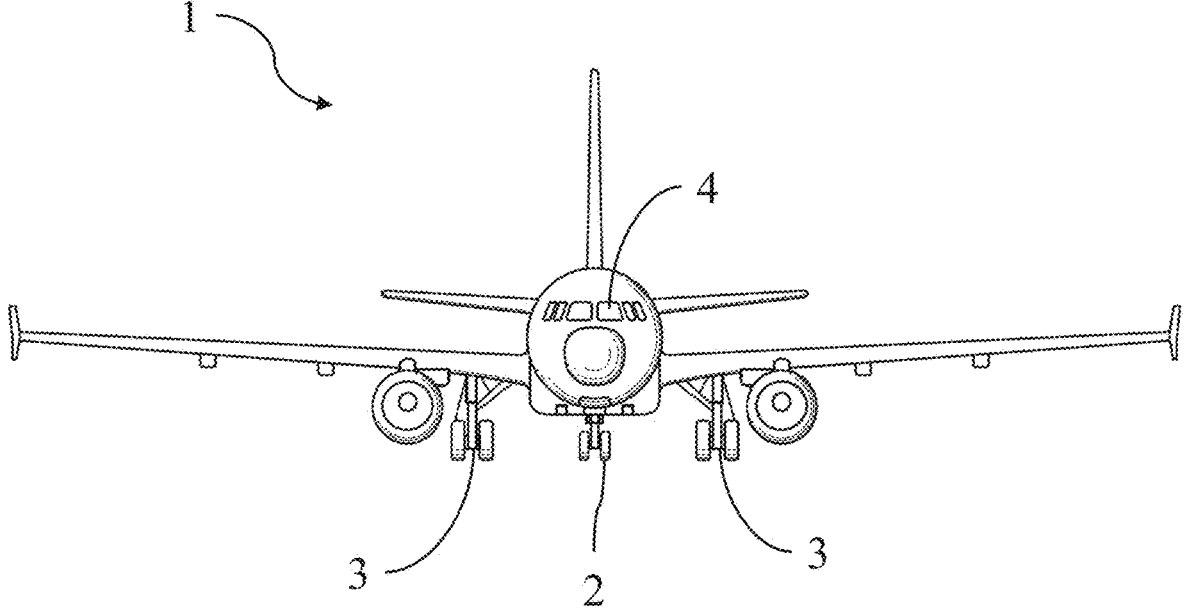
FIG. 1 shows a schematic view of an aircraft.

FIG. 1 shows a schematic view of an aircraft 1 according to an example. The aircraft 1 comprises a nose landing gear 2 and two sets of main landing gear 3. During movement of the aircraft 1 on the ground, the angle of the nose landing gear 2 can be adjusted to alter the trajectory of the aircraft 1 (i.e., to turn the aircraft 1). In some examples, the angle of the main landing gear 3 is also adjusted to aid movement of the aircraft 1 on the ground. The aircraft 1 comprises a cockpit 4 from which a member of the flight crew, e.g. a pilot, controls the aircraft. The cockpit comprises an interface, e.g. a joystick or dial, to control the steering angle of the nose landing gear 2.

FIGS. 2 and 3 show a schematic front and side view of an aircraft landing gear 10 respectively. The aircraft landing gear 10 shown in FIGS. 2 and 3 is the nose landing gear 2 of FIG. 1. In other examples, the aircraft landing gear 10 is the main landing gear 3 of FIG. 1. The aircraft landing gear 10 comprises two tyres 11, a strut 12 and a torque link 13. Each of the tyres 11 comprises a tread 14. The aircraft landing gear 10 is configured to be retracted and stored in a landing gear bay during flight, and to be extended for take-off and landing.

Also shown schematically in FIG. 2 is a system 17 for determining the steering angle of the aircraft landing gear 10. The system 17 comprises an imaging device 15 and an aircraft controller 5. The imaging device 15 is provided on the strut 12 of the aircraft landing gear 10 and captures images of the aircraft landing gear 10. The imaging device 15 is positioned on the strut 12 so as to be directly above the tyre 11 when the landing gear 10 is extended. In some examples, the imaging device 15 is located in another location, for example on another part of the aircraft landing gear 10 or on another part of the aircraft 1 which is in view of the aircraft landing gear 10. The imaging device 15 shown in FIG. 2 comprises a camera. In other examples, the imaging device 15 may comprise another optical imaging device, e.g. a lidar sensor. In some examples, the imaging device 15 comprises both a camera and a lidar sensor. The aircraft controller 5 of the system 17 is configured to carry out any method of determining the steering angle of the aircraft landing gear 10 discussed herein.

Figure 4:
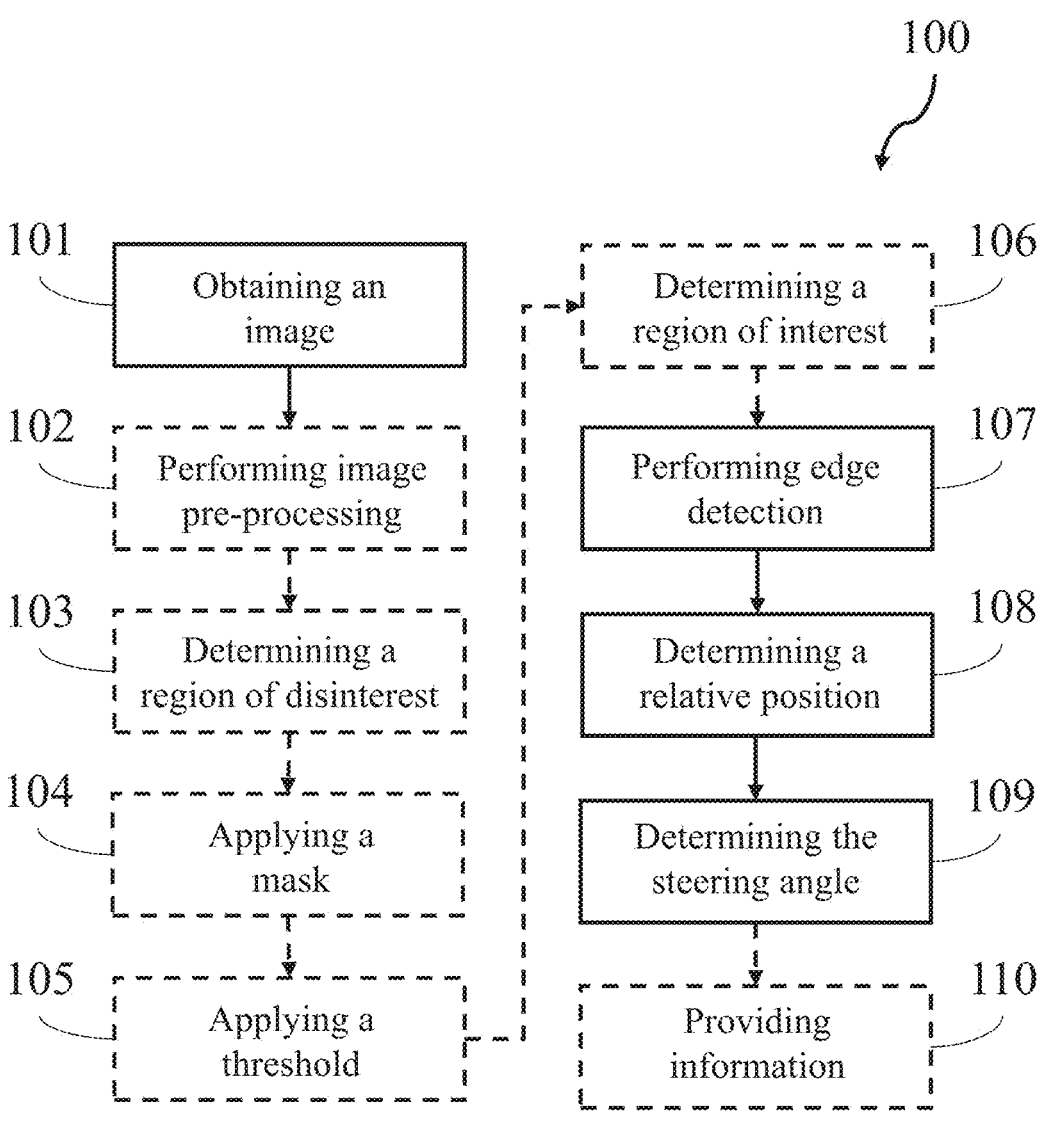
FIG. 4 shows a flow diagram of a method of determining a steering angle of an aircraft landing gear.

FIG. 4 shows a flow chart of a method 100 of determining a steering angle of the aircraft landing gear 10. The method 100 is performed by the aircraft controller 5 and comprises: obtaining 101 an image of the aircraft landing gear 10; performing 107 edge detection on the image; determining 108, based at least in part on an edge obtained by the edge detection, a relative position of a component of the aircraft landing gear 10; and determining 109, based at least in part on the relative position of the component, the steering angle of the aircraft landing gear 10. FIGS. 5a to 5e show schematic views of the image 20 obtained by the method 100.

Figure 5A:
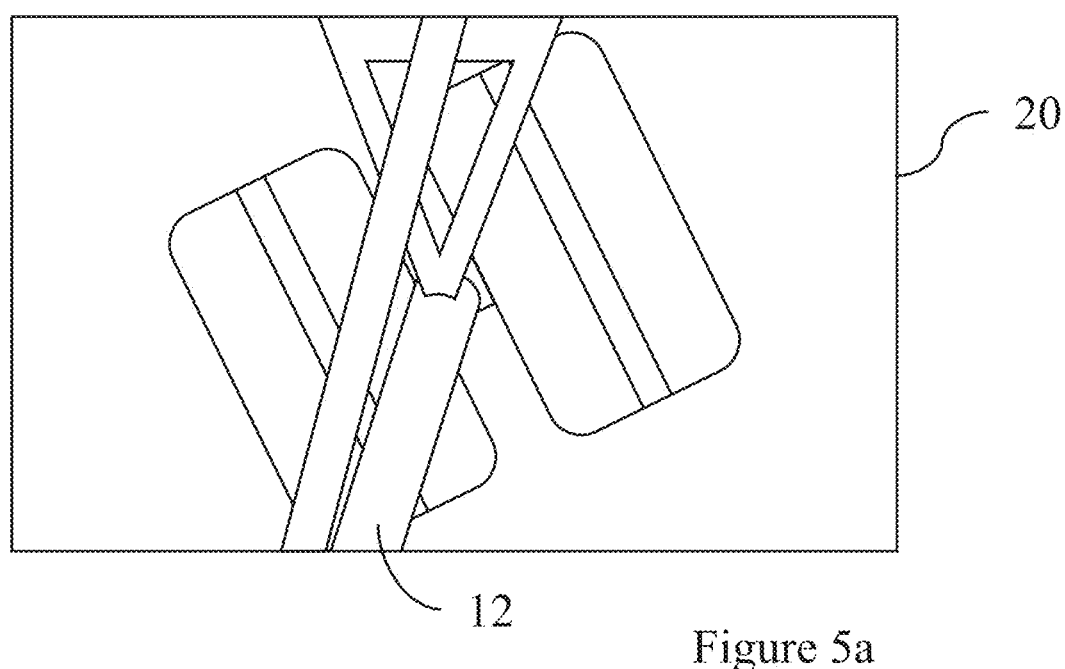
FIGS. 5a to 5e show schematic views of an image of the aircraft landing gear obtained by the method of FIG. 1.

As shown in FIG. 5a, the image 20 includes a view of components of the aircraft landing gear 10. The method 100 comprises determining a relative position of a component of the aircraft landing gear 10 which is used to determine the steering angle. In the image 20, the component comprises one of the tyres 11 of the aircraft landing gear 10 and in particular the tread 14 of the tyre 11. The image 20 shown in FIG. 5a is obtained from the camera 15 positioned on the strut 12 of the aircraft landing gear 10 as shown in FIG. 2. The camera 15 is configured to capture a video of the aircraft landing gear 10 and a single frame of the video is obtained during the method 100 to determine the steering angle. This allows from the continual monitoring of the steering angle of the aircraft landing gear 10. Although the image 20 in FIG. 5a is obtained from the camera 15, in some examples the image 20 is obtained from a memory on the aircraft 1, e.g. where the image 20 has been temporarily stored after previously being captured by the camera.

After the image 20 has been obtained by the aircraft controller 5, the aircraft controller 5 performs the method 100 to perform 102 image pre-processing to the image 20. As shown in FIG. 4, the image pre-processing is applied before any subsequent image processing steps are performed. The image pre-processing includes applying a filter to the image 20 to greyscale the image 20. To greyscale the image 20, each pixel of the image 20 is converted to a shade of grey based on the brightness/luminance of the pixel. Converting the image to greyscale may help with subsequent image processing steps. For example, a grayscale image allows for the creation of a binary image (e.g. through image thresholding) which can then be used for subsequent image analysis.

Performing 102 image pre-processing to the image 20 also includes performing gamma correction on the image 20. The gamma correction may help to correct the brightness level in the image 20 and may improve the subsequent image processing steps. Gamma correction may be applied to the image 20 using a non-linear transformation of the form:

$$O = \left(\frac{I}{255}\right)^{\gamma} \times 255$$

where O is an output pixel value, I is an input pixel value from the image 20 and γ is the gamma correction value. When γ<1 the original dark regions will be brighter and when γ>1 the opposite occurs.

Figure 5B:
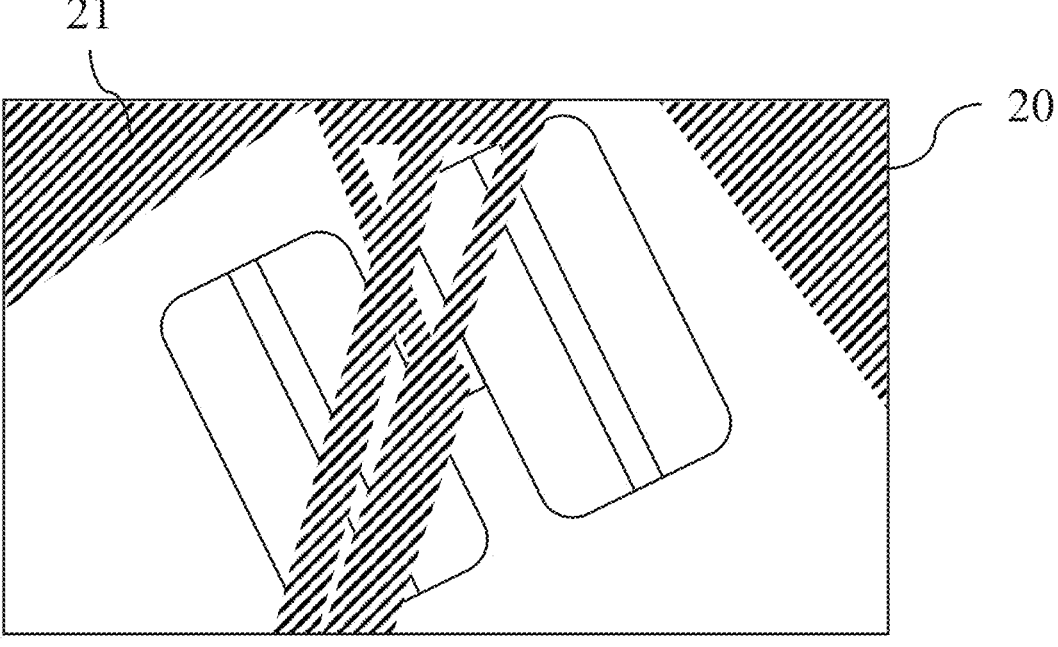

Following performing 102 the image pre-processing, the method 100 comprises determining 103 a region of disinterest in the image 20 and applying 104 a mask 21 to the image 20 to remove the region of disinterest from the image 20. FIG. 5b shows a schematic view of the image 20 after the mask 21 has been applied. In the image 20 shown in FIG. 5b, the mask 21, and therefore the region of disinterest, is indicated by the hatched lines. The region of disinterest includes part of the image 20 in which the tyres 11 are not expected to be present in normal use. For example, in the image 20 of FIG. 5a, the tyres 11 cannot be present in the location of the strut 12. As such, this part of the image 20 is determined to be part of the area of disinterest and the mask 21 is applied to this area (as shown in FIG. 5b). As the tyres 11 are not expected to be in the area of disinterest during normal use, this area is excluded from further analysis which may reduce computational requirements and increase the efficiency of the method 100.

The region of disinterest in FIG. 5b is determined by analysing a series of images of the aircraft landing gear 10 and determining which parts of the image do not vary significantly between sequential images. The series of images are a series of still images taken from the video of the aircraft landing gear 10 captured by the camera 15. It is assumed that any parts of the image which do not vary significantly between sequential images contain components which are substantially static/not moving. As such, these parts of the image are considered less relevant to the determination of the steering angle of the aircraft landing gear 10 and are attributed to the region of disinterest.

To determine the region of disinterest it is determined whether a property of a pixel in one image varies by more than a threshold amount over the corresponding pixel in a subsequent or preceding image. The property comprises a pixel value which may include information such as the colour or intensity of the pixel. If the pixel does not vary by more than the threshold amount, that pixel is determined to be part of the region of disinterest. The threshold amount varies depending on conditions, such as lighting conditions, and can be empirically determined. For example, as the aircraft 1 travels over runway lights, this may affect the relative brightness of sequential images, meaning that a different threshold is required compared to a situation where the lighting conditions are constant. The threshold amount may also vary between different aircraft types. Although the region of disinterest is determined after the image 20 has been obtained in the method 100 of FIG. 4, in some examples the region of disinterest is determined or known before the image 20 is obtained and the mask 21, based on the region of disinterest, is applied after the image 20 is obtained.

Information indicative of the mask 21 and/or region of disinterest is stored on the memory of the aircraft 1 to enable such information to be used in subsequent steering angle determinations. This may allow for quick and easy access to the information, which may increase the efficiency and/or speed of the method 100. In other examples, the information is stored remotely from the aircraft 1, which may allow multiple aircraft 1 to access the information. This may also allow the information to be updated at a central location, rather than having to update the memory of each aircraft 1 individually. For example, the information may be updated if the configuration of the aircraft landing gear 10 is changed or if the position of the imaging device 15 is changed. In some examples, the mask 21 and/or region of disinterest are constant for a given aircraft type.

After performing 102 the image pre-processing and applying 104 the mask to the image, the method 100 comprises applying 105 a threshold to the image 20. Thresholding is a type of image segmentation which changes the pixels of the image 20 to make the image 20 easier to analyse. By applying 105 the threshold to the greyscale image 20, the greyscale image 20 is transformed into a binary image, i.e. a black and white image. The threshold applied to the image 20 replaces each pixel in the image with a black pixel if the intensity of the pixel is less than a threshold value and a white pixel if the intensity is greater than the threshold value. The threshold value is pre-determined and constant for the entire image 20.

The threshold described above uses a pre-determined threshold value which is not dependent on the image 20 being analysed. In some examples, it is desirable to apply a tailored threshold to the image 20 which is better suited to the particular image 20. Such a threshold comprises Otsu thresholding (also known as Otsu's binarization or Otsu's method). Otsu thresholding determines an optimal global threshold from an image histogram. All possible threshold values are iterated and the spread of pixel levels is determined, i.e. the number of pixels that are in the background vs the number of pixels that are in the foreground, with the aim of determining the threshold value which makes these two numbers equal/close to equal.

In some examples, it may be necessary to use a threshold that varies across the image 20, i.e. is not a single constant value across the entire image 20, to account for local lighting inconsistencies. In such examples, an adaptive threshold is used (also known as dynamic and/or local thresholding). Rather than using a single threshold value for the entire image 20, adaptive thresholding calculates a threshold based on a small region around a pixel, which can lead to different threshold values across the image 20. Examples of adaptive threshold which can be used include Mean or Gaussian thresholding. Mean thresholding takes the mean threshold of the pixels surrounding a given pixel, whereas in Gaussian thresholding the threshold value is the Gaussian weighted sum of neighbourhood values (i.e. of the pixels adjacent to the pixel being considered).

Figure 5C:
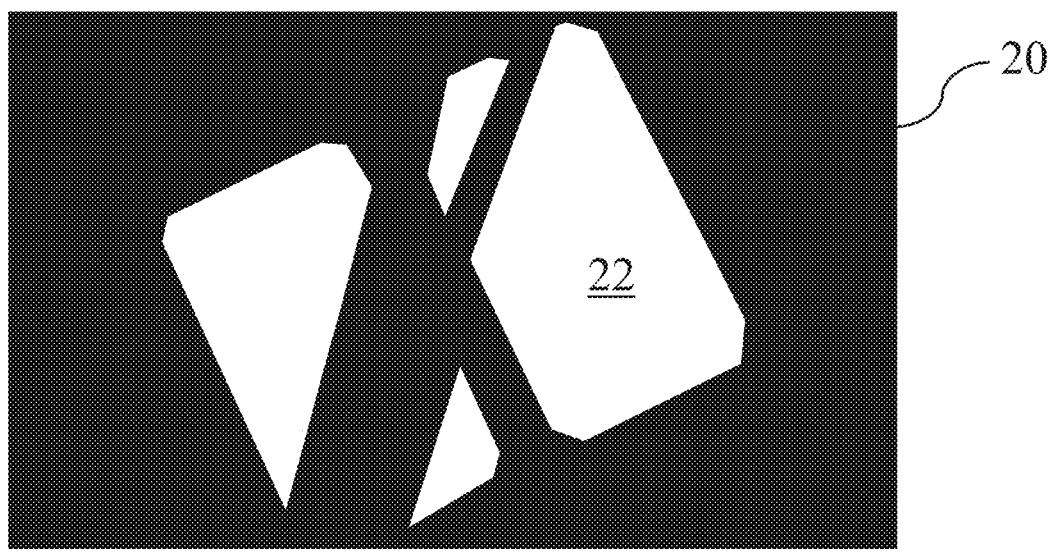
Figure 5D:
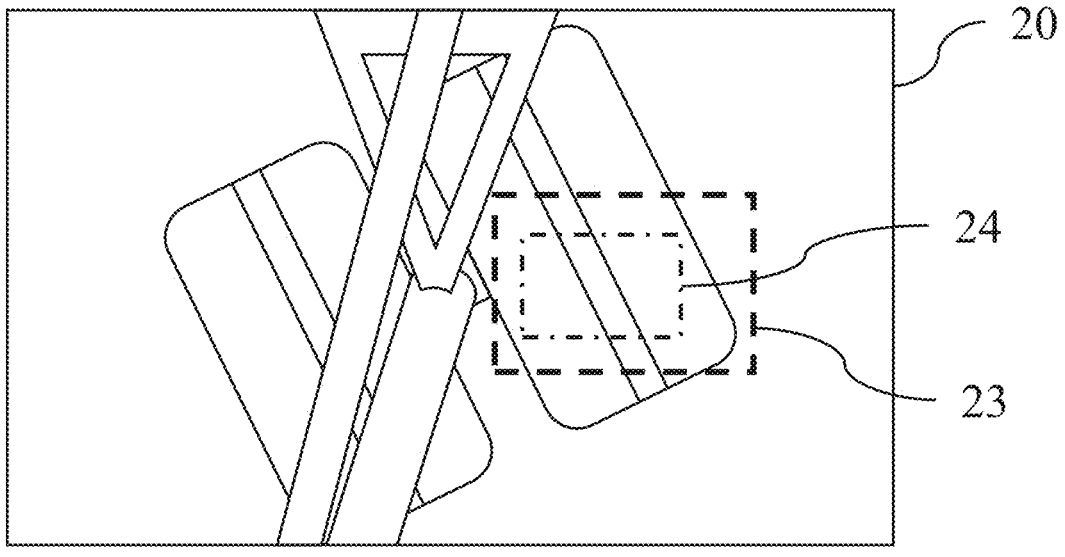

As well as determining the region of disinterest within the image 20 the method also comprises determining 106 a region of interest of the image 20. The region of interest comprises part of the image 20 in which the tyres 11 are located. Determining 106 the region of interest comprises applying contour detection to the image 20. The contour detected image 20 is shown in FIG. 5c. Contour detection enables the identification of borders of objects within an image. In FIG. 5c, the contour detection is performed to locate the tyres 11, or a part thereof, within the image 20. The largest contour 22 that is detected is assumed to be a contour of the tyres 11. As shown in FIG. 5d, the region of interest 23 includes the contour 22 detected in FIG. 5c. Once the area of interest is determined, a smaller portion 24 of the region of interest 23 is selected. This helps to ensure that everything being considered is a part of the tyre 11 and is not a fringe section on the boundary of the tyre 11. The contents of subsection 24 are shown in more detail in FIG. 5e.

Once the portion 24 of the region of interest is selected, the method comprises performing 107 edge detection on the image 20. The edge detection is applied only to the portion 24 identified previously. Edge detection aims to identify edges within a digital image at which the image brightness changes sharply, i.e. where the image brightness is discontinuous. Edge detection processes can generally be grouped into two categories: search-based and zero-crossing based. In search-based methods, edges are detected by first computing a measure of the strength of the edges, e.g. using a first-order derivative expression such as the gradient magnitude, and then searching for local directional maxima of the gradient magnitude using a computed estimate of the local orientation of the edge, usually the gradient direction. In zero-crossing based methods, edges are found by searching for zero crossings (the point where the sign of a mathematical function changes, i.e. the point at which the mathematical function crosses an axis) in a second-order derivative expression, such as the Laplacian, computed from the image. As shown in FIG. 4, performing 107 edge detection occurs after the other image processing steps discussed above have been completed.

Performing 107 edge detection on the image 20 comprises performing Canny edge detection. Canny edge detection is a particular type of edge detection which uses a multi-stage algorithm to detect a wide range of edges in images. Firstly, a Gaussian filter is applied to the image to smooth the image and remove noise. The filter uses a Gaussian function of the form:

$$G(x) = \frac{1}{2\pi\sigma^2} e^{-\frac{x^2+y^2}{2\sigma^2}}$$

where x is the distance from the origin in the horizontal axis, y is the distance from the origin in the vertical axis and a is the standard deviation of the Gaussian distribution.

Next, intensity gradients within the image are found. An edge detection operator (e.g. a Roberts, Prewitt or Sobel operator) is applied to the image to return the first derivative in the horizontal direction ($G_x$) and the vertical direction ($G_y$). From this, the edge gradient G and direction θ can be determined by:

$$G = \sqrt{G_x^2 + G_y^2}$$

$$\theta = \arctan\left(\frac{G_y}{G_x}\right)$$

The edge direction is rounded to one of four angles representing vertical, horizontal, and the two diagonals (i.e. 0°, 45°, 90° and 135°).

Once the intensity gradients have been found in the image 20, a gradient magnitude threshold or lower bound cut-off suppression is applied to the image 20. This is an edge thinning technique which is used to remove unwanted spurious points on the edges of the image 20. Lower bound cut-off suppression is applied to find the locations with the sharpest change of intensity value. The edge strength of the current pixel is compared with the edge strength of the pixel in the positive and negative gradient directions. If the edge strength of the current pixel is the largest compared to the other pixels with the same direction (e.g. a pixel that is pointing in the y-direction will be compared to the pixel above and below it in the vertical axis), the value is preserved. Otherwise, the value will be suppressed.

A double threshold is then applied to determine potential edges and to suppress weak edges. Although the previous edge thinning techniques means that the remaining edge pixels provide a more accurate representation of the edges of the image, some spurious edge pixels may remain. To filter these out, high and low threshold values are selected. If an edge pixel's gradient value is smaller than the high threshold value and larger than the low threshold value, it is marked as a weak edge pixel. If an edge pixel's gradient value is smaller than the low threshold value, it is suppressed. The thresholds selected are dependent on the image being analysed and are empirically determined.

The detection of edges is finalised by suppressing any remaining weak edges which are not connected to strong edges. A weak edge which is associated with a true edge (i.e. an actual edge of an object in the image) is expected to be attached to a strong edge. Therefore, any weak edge which is not attached to a strong edge is likely caused by noise/colour variations and can be suppressed. This is done by looking at a weak edge pixel and its eight connected neighbourhood pixels. As long as there is one strong edge pixel within the connected neighbourhood pixels, the weak edge pixel can be identified as one that should be preserved.

Although Canny edge detection is used in the method 100 of FIG. 4, in some examples, the edge detection may comprise other algorithms. For example, the edge detection may comprise Sobel, Prewitt or Roberts algorithms.

Figure 5E:
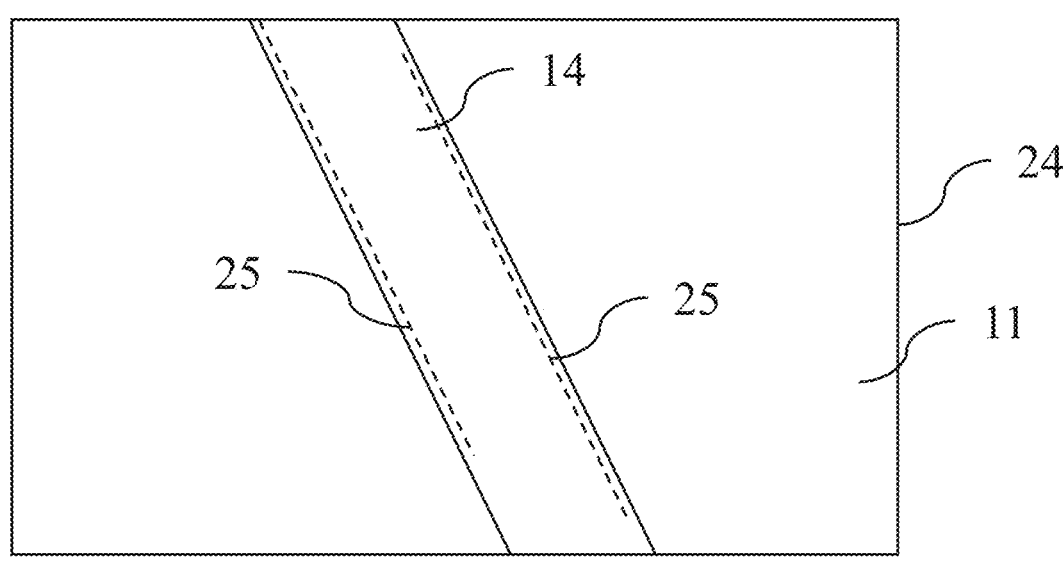

After edge detection has been applied to the image 20, the method 100 comprises determining 108 a relative position of the tread 14 of the tyre 11. Determining 108 the relative position comprises determining an angle of the tread 14 of the tyre 11 relative to the camera. As illustrated in FIG. 5e, the method comprises determining the angle of the tread by applying a Hough transform to the portion 24 to find straight lines (as indicated by dashed lines 25 in FIG. 5e) within the portion 24. The straight lines 25 indicate the edges of the tread 14 and the angle of the lines 25 are indicative of the steering angle of the aircraft landing gear 10.

The Hough transform is a feature extraction technique which is used to identify lines in an image. In polar coordinates, every point on a line can be described using a pair r, 8 (also known as Hough space), where r is the shortest distance from the origin to the closest point on the line (approaching the line perpendicularly) and 8 is the angle between the x-axis and a line connecting the origin with the closest point on the line. For a given line, specific r and 8 values can be determined which satisfy the following equation for each point x, y:

$$r = x \cos \theta + y \sin \theta$$

Each point along a line in the portion 24 of the image 20 can be mapped as a sinusoid in Hough space, while each point in Hough space is mapped as a line in image space.

Therefore, a point at which sinusoids intersect in Hough space indicates the presence of a straight line in the image 20.

By applying a Hough transform to the edge detected image 20, a relative angle of the tread 14 of the tyre 11 is determined. The relative angle of the tread 14 is the angle of the tread relative to the camera 15. The method 100 then comprises determining 109 the steering angle of the aircraft landing gear, based at least in part the relative angle of the tread 14 of the tyre 11. Where multiple lines 25 are determined from the Hough transform, a median of the angles of the lines 25 is taken to determine the steering angle of the aircraft landing gear 10. In some example, another central tendency of the angles of the lines 25 may be determined, such as a mean or a mode of the angles of the lines 25. To help to ensure that erroneous line lengths are disregarded (e.g. those too small to be an edge of the tread 14), a predefined limit is applied to ignore such lines. The predefined limit is a minimum length (e.g. minimum number of pixels) for a line to be considered an edge of the tread 14. Any lines below the predefined length are disregarded.

Although the method 100 has been described with relation to the component of the aircraft landing gear 10 being the tyre 11, in some examples the component may be another part of the aircraft landing gear 10. For example, the component may be the torque link 13, where the torque link 13 comprises a reference mark 16 (as shown in FIG. 3). In such an example, the determining 108 the relative position of the component comprises determining, based at least in part on the edge obtained by the edge detection, the relative position of the reference mark 16. Although one reference mark 16 is shown in FIG. 3, in some examples the component the torque link 13 comprises a plurality of such reference marks.

The reference mark 16 may help in determining the position of the torque link 13 relative the imaging device 15. For example, the reference mark 16 may be less susceptible to external influence than the torque link 13 as a whole, e.g. it may be less likely that an external force moves the reference mark 16 in an undesirable/inconsistent way. Therefore, the reference mark 16 may provide a more consistent reference point for determining the position of the torque link 13.

Furthermore, the reference mark 16 is arranged such that it is not occluded from the camera, even when a part of the torque link 13 is occluded from the camera. This may allow the position of the torque link 13 to be determined even when the part of the torque link is occluded. In other examples, the reference mark 16 is omitted and the steering angle is determined based on an edge of the torque link 13 obtained by the edge detection. In some examples, the component comprising the reference mark 16 is another component of the aircraft landing gear, for example a bogie of the aircraft landing gear 10.

After the steering angle of the aircraft landing gear 10 has been determined, the method 100 comprises providing 110 information indicative of the steering angle of the aircraft landing gear 10 to the crew, e.g. the pilot, of the aircraft 1. The steering angle, or the information indicative of the steering angle, is displayed in the cockpit 4 of the aircraft 1 such that it is easily available to the pilot. In this way, the pilot is informed of the steering angle of the aircraft landing gear even if the aircraft landing gear is not in their direct sight. This may help the pilot with manoeuvring the aircraft 1 on the ground.

The determined steering angle of the aircraft landing gear 10 is used to limit further movement/rotation of the aircraft landing gear 10. For example, if the steering angle of the aircraft landing gear 10 is determined to be at a maximum safe steering angle, the pilot is prevented from increasing the steering angle further. The pilot may also receive a warning or other feedback when the maximum steering angle is reached. In some examples, when the pilot is using a physical input to control the steering angle, physical feedback through the input, e.g. shaking of the input, may be provided to the pilot to indicate when the maximum steering angle is reached.

In some examples, the information indicative of the steering angle of the aircraft landing gear 10 is provided to the crew of the aircraft 1 while the aircraft 1 is not on the ground. This information may be used to determine whether the aircraft landing gear 10 is in the correct position/orientation for landing and/or cruise. This may allow the crew to make an informed decision on whether it is safe to continue with landing and/or continued flight.

In some examples, the determined steering angle is stored, for example on the memory of the aircraft 1. Additionally or alternatively, the determined steering angle is stored on a database accessible by the aircraft 1, for example a database remote from the aircraft 1. In this way, the determined steering angle can be used to aid future steering angle determination or can be reviewed post flight to determine and analyse the accuracy of the method 100. As such, improvements can be made to the method 100 from a review of previously determined steering angles.

In some examples, any one or more of the steps of performing 102 image pre-processing, determining 103 the region of disinterest, applying 104 the mask, applying 105 the threshold, determining 106 the region of interest and/or providing 110 information may be omitted from the method 100.

Although the method 100 utilises edge detection in determining the steering angle of the aircraft landing gear 10, in some examples another form of feature detection may be used. For example, corner detection (where corners in an image are detected) or ridge detection (where ridges in an image are detected) may be used.

As the method 100 relies on the detection of edges of the component of the aircraft landing gear 10, it may be more difficult to carry out this method 100 when the component is partially occluded from the camera 15. An additional method 200 of determining the steering angle of the aircraft landing gear 10 which is not as affected by occlusion is shown in FIG. 6.

Figure 6:
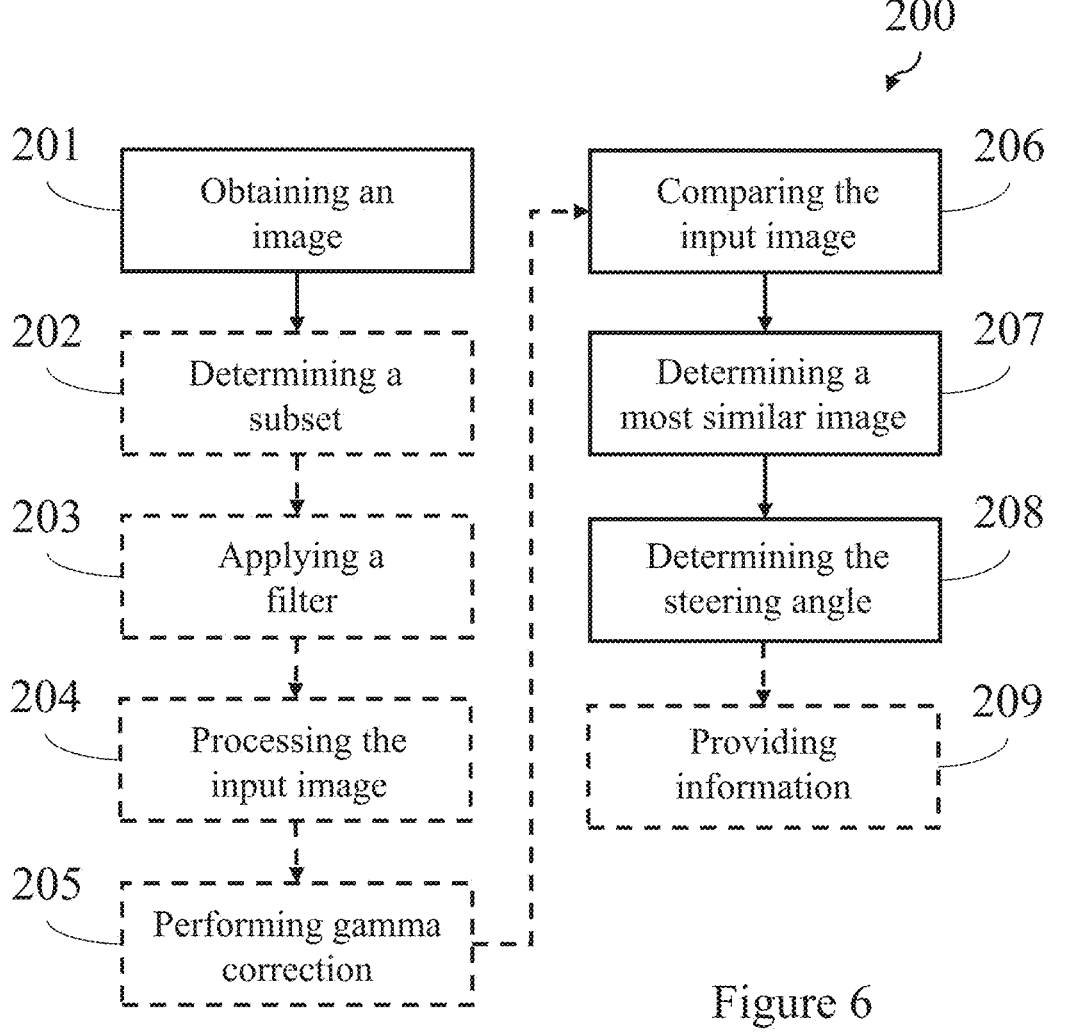
FIG. 6 shows a flow diagram of another method of determining the steering angle of the aircraft landing gear.

FIG. 6 shows a flow chart of a further method 200 of determining a steering angle of an aircraft landing gear 10. The method 200 is a computer-implemented method 200 of determining the steering angle of the aircraft landing gear 10. The method 200 is carried out by the aircraft controller 5 and comprises obtaining 201 an input image of the aircraft landing gear 10 and comparing 206 the input image against a plurality of reference images, e.g. a set of reference images or database of reference images. The plurality of reference images comprises images of the aircraft landing gear 10 at known steering angles. The method 200 comprises determining 207 a most similar reference image, where the most similar reference image comprises the reference image of the plurality of reference images most closely matched to the input image, and determining 208, based at least in part on the most similar reference image, the steering angle of the aircraft landing gear 10.

Figure 7:
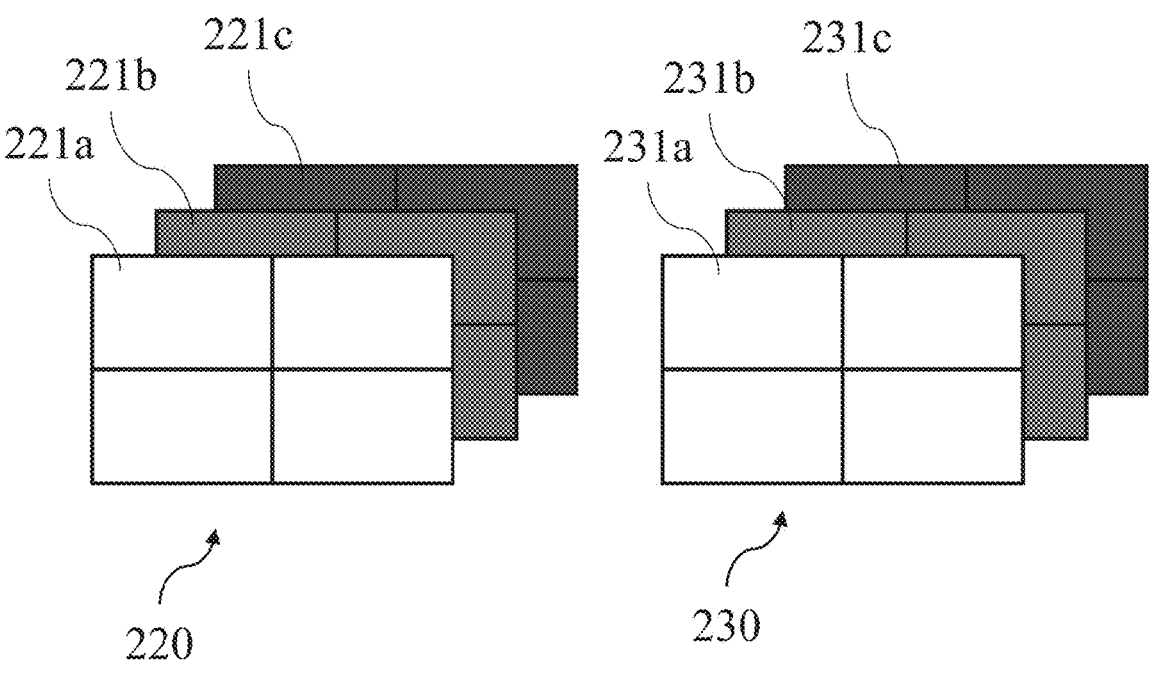
FIG. 7 shows schematic views of an input image and a reference image of the method of FIG. 6.

FIG. 7 shows a schematic illustration of the input image 220 and a reference image 230 of the plurality of reference images 230. In FIG. 7, the input image 220 and the reference image 230 are shown split into their respective red 221*a*, 231*a*, green 221*b*, 231*b* and blue 221*c*, 231*c* component planes.

Before the input image 220 is compared against the plurality of reference images 230, the method 200 comprises determining 202 a subset of the plurality of reference images 230 to be compared against the input image 220. The subset is determined based on a previous determination of the steering angle of the aircraft landing gear 10. As the steering angle will not be expected to have changed significantly from the previous determination, the subset can be focussed near to the previously determined steering angle to reduce the number of comparisons that are needed to be made. For example, when the steering angle has previously been determined to be at +20° (i.e. 20° clockwise, as viewed from above, such that the aircraft 1 would turn to the right when moving forward), the subset comprises reference images 230 which have steering angles within a predefined range of this steering angle. For example, when the predefined range is 10°, the subset will include the reference images 230 with a steering angle of between +10° and +30°. Alternatively, the predefined range may be 5°, 15°, 20°, 25°, 30° or any other suitable range. Although the subset is determined after the input image 220 has been obtained in FIG. 6, in some examples, the subset is determined before the input image 220 is obtained.

As the input image 220 obtained by the method 200 may not be in optimal condition to be compared against the plurality of reference images 230, the input image 220 is modified to help to address this. For example, the input image 220 may contain excess noise which should be removed/reduced to improve the subsequent comparison. Therefore, after the input image is obtained, the method 200 comprises applying 203 a filter to the input image 220 to greyscale the image and processing 203 the input image to remove background noise from the input image. To grayscale the input image 220, each pixel of the input image 220 is converted to a shade of grey based on the brightness/luminance of the pixel. To remove noise from the input image 220, a smoothing filter, such as a Gaussian smoothing, is applied to the input image 220.

When the input image 220 is captured, the brightness (or perceived brightness) of the input image 220 may be inconsistent with the brightness of each of the plurality of reference images 230. For example, where the input image 220 is captured at night, and the plurality of reference images were captured in daylight, there will be a difference in light levels between the images. Where the input image 220 is too dark, this may obscure features of the input image 220 which are to be compared with the reference images 230. To help to address this, the method 200 comprises performing 205 gamma correction on the input image 220. The gamma correction is based on the gamma level of the plurality of reference images 230 and may help to improve the consistency of gamma levels between the input image 220 and the plurality of reference images 230. This may help to increase the accuracy of the comparison of the input image 220 against the plurality of reference images 230. The gamma correction may take the form as discussed in relation to the method of FIG. 4 above.

In some examples, both the input image 220 and the plurality of reference images 230 are processed in the same way. The processing may comprise at least one of masking, histogram matching, cropping, blurring, contrast limited adaptive histogram matching, sharpening and denoising.

To mask the input image 220 and the plurality of reference images 230, reference images in the plurality of reference images 230 are compared against each other to determine how much corresponding pixels (and their pixel values) change between different reference images 230. Where a pixel value changes by less than a predetermined threshold value, those pixels are determined to be part of the background of the reference image 230 and are therefore not relevant to the determination of steering angle of the aircraft landing gear 10. The pixels which are determined to be part of the background are then masked from the input image 220 and the plurality of reference images 230.

Histogram matching comprises modifying the input image 220 such that a histogram of the input image 220 matches a histogram of the plurality of reference images 230. In some examples, the input image 220 and the plurality of reference images 230 are modified such that the histograms of the input image 220 and the plurality of reference images 230 match a predetermined histogram. Alternatively, contrast limited adaptive histogram matching may be used to match the histogram of the input image 220 and the histogram of the plurality of reference images 230.

As only a portion of the input image 220 and the plurality of reference images 230 (such as a portion containing the aircraft landing gear 10) may be of interest when determining the steering angle, in some examples, the input image 220 and the plurality of reference images 230 may be cropped to only include a predetermined steering region. The steering region is a region within the input image 220 and the plurality of reference images 230 which includes the parts of the aircraft landing gear 10 that move when the steering angle changes.

In some examples, the input image 220 and the plurality of reference images 230 are smoothed by blurring. Blurring of the input image 220 and the plurality of reference images 230 is achieved by convolving the images with a low-pass filter kernel. The blurring may comprise averaging, Gaussian blurring, median blurring and/or bilateral filtering.

To sharpen the input image 220 and the plurality of reference images 230, in some examples, a sharpening kernel, such as that shown below, is applied to the input image 220 and each reference image 230 of the plurality of reference images 230.

$$\begin{bmatrix} 0 & -1 & 0 \\ -1 & 5 & -1 \\ 0 & -1 & 0 \end{bmatrix}$$

In some examples, denoising the input image 220 and/or the plurality of reference images 230 comprises applying a non-local means denoising algorithm to the input image 220 and/or the plurality of reference images 230. Non-local means denoising comprises replacing the colour of an individual pixel in an image with an average of colours of similar pixels within the image.

After the input image 220 has been modified as desired, the method 200 comprises comparing 206 the input image 220 against the subset of the plurality of reference images 230 and determining 207 a most similar reference image 230. The most similar reference image 203 is the reference image 230 of the plurality of reference images 230 most closely matched to the input image 220. Comparing 206 the input image 220 against the plurality of reference images 230 comprises comparing input image pixel values of the input image 220 against corresponding reference image pixel values of each of the plurality of reference images 230. If a suitable match (i.e. a reference image 230 having a similarity characteristic within a predetermined threshold of the input image 220) is not found in the subset, the subset is expanded to include additional reference images 230 until a suitable match is found.

In FIG. 7, the input image pixel values and the reference image pixel values comprise information indicative of the colours of pixels in the input image 220 and reference images 230 respectively. The input image 220 and the reference image 230 each comprise a red component value 221_a_, 231_a_, a green component value 221_b_, 231_b_ and a blue component value 221_c_, 231_c_. When comparing the input image 220 against the reference image 230, the values and/or relative values of the red, green and/or blue component values of the individual pixels are compared. To do this, the method 200 comprises calculating a similarity metric between the input image 220 and the reference image 230. In this case, the method comprises calculating the root mean square deviation (RMSD) between the input image pixel values and the corresponding reference image pixel values. This calculation is carried out for each of the reference images 230 in the subset, and the reference image 230 with the smallest RMSD between the input image pixel values and the reference image pixel values is determined to be the most similar reference image 230. In some examples, a different similarity metric is calculated. For example, the similarity metric may comprise the total number of pixel values in common between the input image 220 and the reference image 230. A respective similarity metric for each reference image may be determined and the reference image 230 with the similarity metric closest to a threshold value may be determined, wherein the threshold value is indicative of the highest degree of similarity. Another similarity metric which may be used is a cosine similarity. In some examples, the input image pixel values are transformed into a one-dimensional input image vector and the reference image pixel values are transformed into a one-dimensional reference image vector. The cosine similarity between the input image vector and the reference image vector is then calculated. This calculation is carried out for each of the reference images 230 in the subset, and the reference image 230 with the greatest cosine similarity between the input image vector and the reference image vector is determined to be the most similar reference image 230.

Although the components of the colours of the pixels are compared in the method of FIG. 6, in some examples, such as when the input image 220 and the reference images 230 are not in colour, the input image pixels values and the reference image pixel values may comprise the intensity of the relevant pixels. The most similar reference image 230 is then the reference image 230 with the most pixels having the same or similar intensity as in the input image 220.

It is also possible to use machine learning to determine the most similar reference image 230. For example, determining 207 the most similar reference image 230 may comprise utilising a machine learning algorithm. The machine learning algorithm may comprise the input image 220 as an input, and the most similar reference image 230 as an output. Such a machine learning algorithm may be trained to provide its output based on a set of training data, for example a set of training data labelled with ground truth values in a supervised learning process. For example, the plurality of reference images 230 at known steering angles may be used to train the machine learning algorithm. In another example, measured data may form a training data set. In some examples, the machine learning algorithm may be updated in real-time based on data obtained by the aircraft 1, or other aircraft of the same type. In some examples, the machine learning algorithm may comprise a neural network.

Based at least in part on the most similar reference image 230, the method 200 comprises determining 208 the steering angle of the aircraft landing gear 10. As the steering angle of each of the reference images 230 is known, the steering angle of the most similar reference image 230 is determined to be the steering angle of the aircraft landing gear 10.

Once the steering angle has been determined, the method 200 comprises providing 209 information indicative of the steering angle of the aircraft landing gear 10 to the crew, e.g. the pilot, of the aircraft 1. The steering angle, or the information indicative of the steering angle, is displayed in the cockpit 4 of the aircraft 1 such that it is easily available to the pilot. In this way, the pilot is informed of the steering angle of the aircraft landing gear even if the aircraft landing gear is not in their direct sight. This may help the pilot with manoeuvring the aircraft 1 on the ground.

The determined steering angle of the aircraft landing gear 10 is used to limit further movement/rotation of the aircraft landing gear 10. For example, if the steering angle of the aircraft landing gear 10 is determined to be at a maximum safe steering angle, the pilot is prevented from increasing the steering angle further. The pilot may also receive a warning or other feedback when the maximum steering angle is reached. In some examples, when the pilot is using a physical input to control the steering angle, physical feedback through the input, e.g. shaking of the input, may be provided to the pilot to indicate when the maximum steering angle is reached.

In some examples, the information indicative of the steering angle of the aircraft landing gear 10 is provided to the crew of the aircraft 1 while the aircraft 1 is not on the ground. This information may be used to determine whether the aircraft landing gear is in the correct position/orientation for landing and/or cruise. This may allow the crew to make an informed decision on whether it is safe to continue with landing and/or continued flight.

In some examples, the determined steering angle is stored, for example on the memory of the aircraft 1. Additionally or alternatively, the determined steering angle is stored on a database accessible by the aircraft, for example a database remote from the aircraft 1. In this way, the determined steering angle can be used to aid future steering angle determination or can be reviewed post flight to determine and analyse the accuracy of the method 100. As such, improvements can be made to the method 100 from a review of previously determined steering angles.

Although the method 200 as described above compares the input image 220 against the subset of the plurality of reference images 230, in some examples the method 200 compares the input image 220 against all of the plurality of reference images 230. The plurality of reference images 230 comprises a series of images of the aircraft landing gear 10 where there is an interval of between 10° and 0.5° of steering angle between each image. In some examples, the interval may be between 8° and 0.5°, 6° and 0.5°, 4° and 0.5°, 2° and 0.5°, or 1° and 0.5°. The plurality of reference images covers a total range of steering angles of the aircraft landing gear 10 of 140°, i.e. between −70° (70° to the left) and +70° (70° to the right). In some examples, the total range is between 100° and 180°, between 120° and 160° or between 130° and 150°. In some examples, other ranges are also possible.

The plurality of reference images 230 are generated by capturing images of the aircraft landing gear 10 while at the same time receiving information indicative of the steering angle of the aircraft landing gear 10. The images and their corresponding steering angles are saved to the memory, along with a mapping between the reference image 230 and the corresponding steering angle. In some examples, the information indicative of the steering angle is determined by a sensor, e.g. a rotary variable differential transformer (RVDT), on the aircraft landing gear 10.

Figure 8:
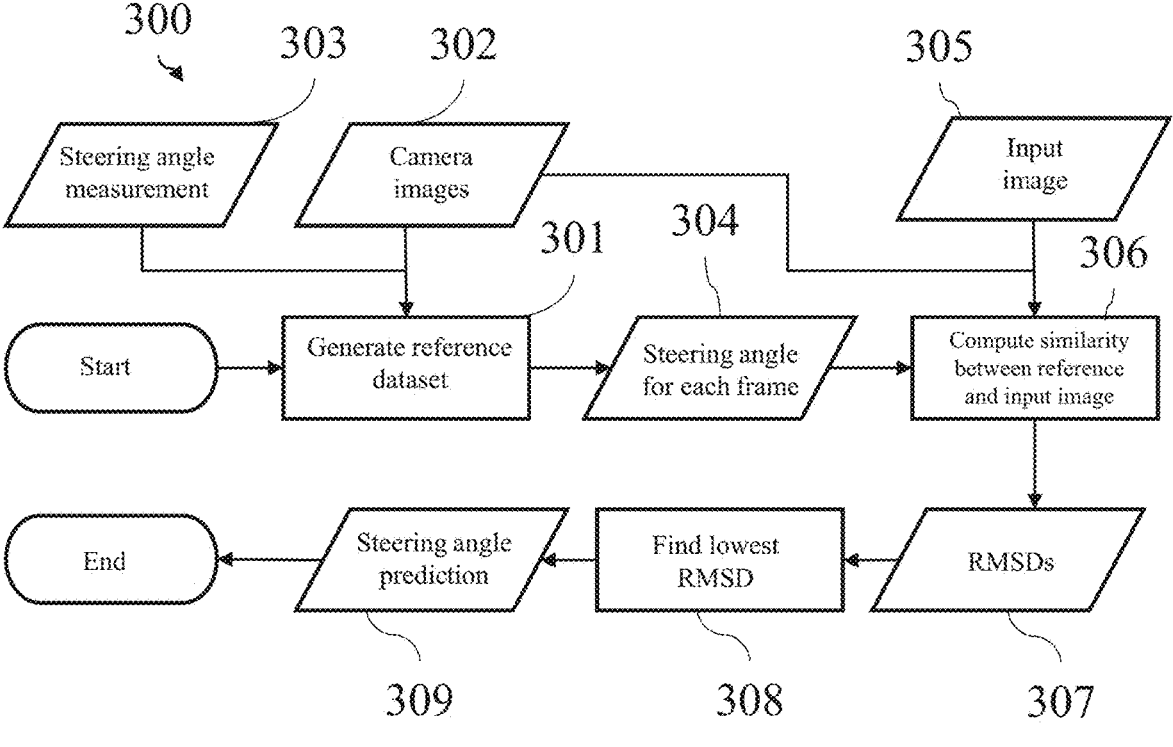
FIG. 8 shows a flow diagram of another method of determining the steering angle of the aircraft landing gear.

The plurality of reference images 230 are stored on the memory of the aircraft 1. In this way, the plurality of reference images 230 can be quickly accessed by the method 200. In some examples, the reference images are stored on a database accessible by the aircraft 1, such as a database remote from the aircraft 1. This may allow multiple aircraft 1 to access the plurality of reference images 230 and may also allow the plurality of reference images 230 to be updated at a central location, rather than having to update the memory of each aircraft 1 individually An implementation of the method 200 is further illustrated in the flow chart 300 of FIG. 8. A reference dataset (e.g. a plurality of reference images) is generated (box 301) by capturing images (box 302) of the aircraft landing gear with the camera while measuring 303 (box 303) the steering angle of the aircraft landing gear 10 and mapping the images to the corresponding measured steering angle, such that the steering angle of each frame captured by the camera is known (box 304). An input image 220 (box 305) from the camera is compared against the reference dataset to compute similarities (box 306). From this, the RMSD of each image in the reference dataset compared to the input image 220 is calculated (box 307). The reference image with the lowest associated RMSD is found (box 308) and is used to predict (box 309) the steering angle of the input image 220 and therefore the aircraft landing gear 10.

In some examples, any one or more of the steps of determining 202 the subset, applying 203 the filter, processing 204 the input image, performing 205 the gamma correction and/or providing 209 information may be omitted from the method 200.

Figure 9:
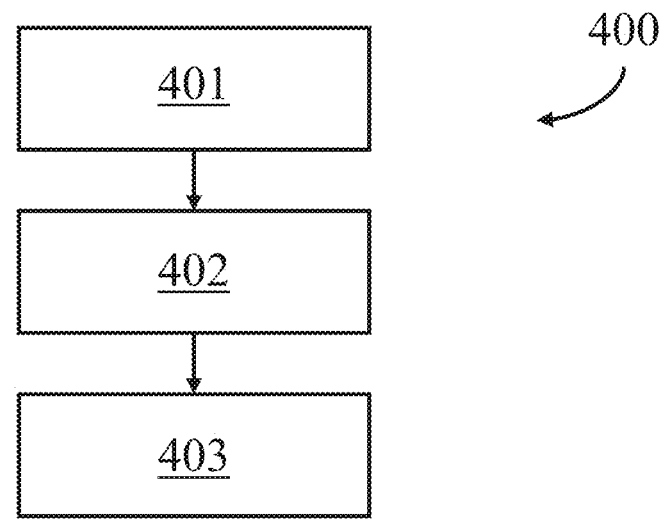
FIG. 9 shows a flow diagram of another method of determining the steering angle of the aircraft landing gear.

As discussed above, the method 200 of FIG. 6 may work better in certain situations than the method 100 of FIG. 4. As such, it is advantageous to be able to select between the two methods 100, 200 when attempting to determine the steering angle of an aircraft landing gear 10. This may allow the best method 100, 200 to be used for the given conditions. FIG. 9 shows a flow chart of such a method 400 of determining a steering angle of the aircraft landing gear 10. The method 400 comprises determining 401 a condition affecting the aircraft landing gear 10. The condition is a determination of whether the tyre 11 of the aircraft landing gear is occluded from the camera. In other examples, the condition may be another condition affecting the determination of the steering angle of the aircraft landing gear 10, such as a weather condition and/or an operation status of the imaging device 15.

The method 400 comprises selecting 402 a first mode of determining the steering angle of the aircraft landing gear 10 or a second mode determining the steering angle of the aircraft landing gear 10, based at least in part on the condition. The first mode is the method 100 as described in relation to FIG. 4 and the second mode is the method 200 as described in relation to FIG. 6. As such, the optimal or preferred method for determining the steering angle of the aircraft landing gear 10 given the condition can be selected. Once the mode has been selected, the method 400 comprises determining 403 the steering angle of the aircraft landing gear 10 using the selected mode.

As the first and second modes (and the methods 100, 200) are different method of determining the steering angle of the aircraft landing gear 10, the first and second modes may have different failure conditions. As such, when one of the modes/methods is not working as desired, the other mode/method can be selected. By being able to expressly select the first or second mode, the optimal mode can be selected without having to rely on any other input/information. For example, it is not necessary for one of the modes to fail before the other mode is used.

Although in the above example the first mode is the method 100 as described in relation to FIG. 4 and the second mode is the method 200 as described in relation to FIG. 6, in other examples the first mode and/or the second mode may comprise another method of determining the steering angle of the aircraft landing gear 10. The first mode and/or the second mode may comprise using a sensor, such as a rotary variable differential transformer (RVDT), to determine the steering angle of the aircraft landing gear 10, or may comprise using another suitable form of computer vision to determine the steering angle of the aircraft landing gear 10.

Figure 10:
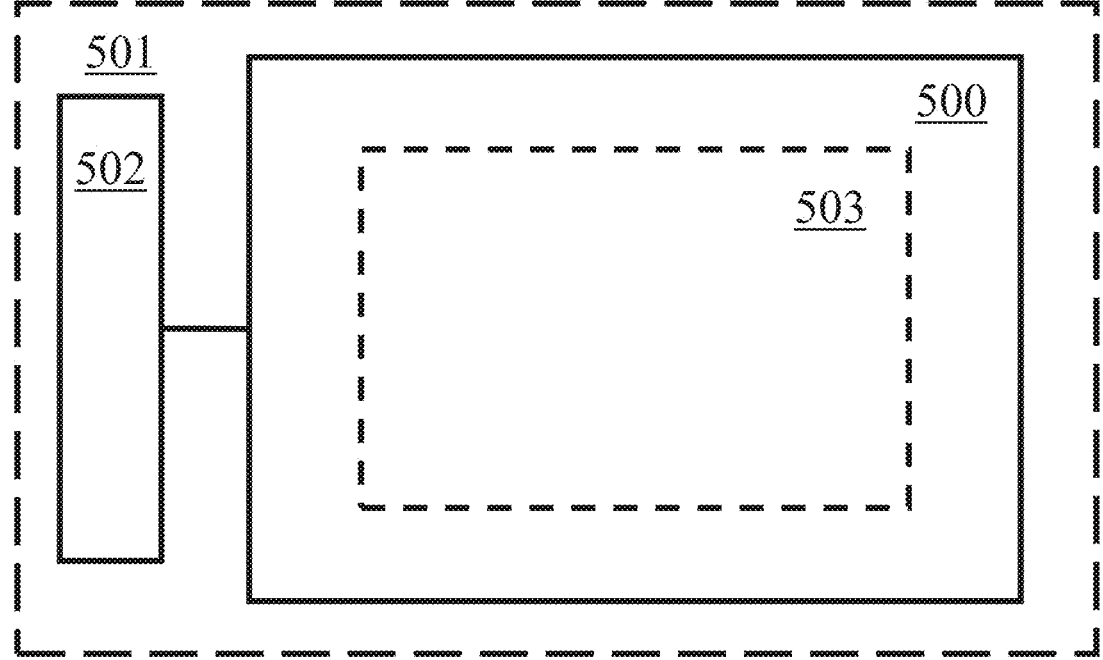
FIG. 10 shows a schematic diagram of a non-transitory computer-readable medium.

FIG. 10 shows a schematic diagram of a non-transitory computer-readable storage medium 500 according to an example. The non-transitory computer-readable storage medium 500 stores instructions 503 that, if executed by a processor 502 of an aircraft controller 501, cause the processor 502 to perform one of the methods described herein. In some examples, the aircraft controller 501 is the aircraft controller 5 described above with reference to FIG. 1 or a variant thereof described herein. The instructions 503 may comprise instructions to perform any of the methods 100, 200, 400 described above with reference to FIGS. 4 to 9 or variants thereof, such as those discussed herein.

Any step or feature discussed in relation to one of the methods 100, 200, 400 discussed herein may be used in combination with the steps and features of any other method 100, 200, 400 discussed herein.

It is to noted that the term "or" as used herein is to be interpreted to mean "and/or", unless expressly stated otherwise.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of determining a steering angle of an aircraft landing gear on an aircraft, the method comprising:

obtaining an image of the aircraft landing gear, wherein the image is obtained by an imaging device located on a part of the aircraft with a view of the aircraft landing gear;

performing edge detection on the image;

determining, based at least in part on an edge obtained by the edge detection, a relative position of a component of the aircraft landing gear in the image, wherein the relative position is a position of the component of the aircraft landing gear in the image relative to a position of a fixed component of the aircraft landing gear, a part of the aircraft separate to the aircraft landing gear, or a part of a landing gear bay of the aircraft, or relative to the imaging device;

determining, based at least in part on the relative position of the component, the steering angle of the aircraft landing gear;

determining whether the steering angle is at a maximum steering angle, and in response to the determination that the steering angle is at the maximum steering angle, preventing increasing the steering angle while the steering angle is at the maximum steering angle.

2. The method according to claim 1, further comprising obtaining the image of the aircraft landing gear using an imaging device.

3. The method according to claim 2, wherein the determining the relative position of the component comprises determining, based at least in part on the edge obtained by the edge detection, a position of the component of the aircraft landing gear relative to the imaging device.

4. The method according to claim 1, further comprising determining a region of disinterest of the image, the region of disinterest comprising part of the image in which the component is not expected to be present in normal operation, and applying a mask to the image to remove the region of disinterest from the image.

5. The method according to claim 1, further comprising:

determining a region of interest of the image, the region of interest comprising part of the image in which the component is located; and selecting a portion of the region of interest;

wherein the performing edge detection on the image comprises performing edge detection on only the portion of the region of interest.

6. The method according to claim 5, further comprising performing contour detection on the image to determine the region of interest.

7. The method according to claim 1, wherein the component of the aircraft landing gear comprises a tire.

8. The method according to claim 7, wherein the tire comprises a tread, and the method further comprises:

the determining, based at least in part on the edge obtained by the edge detection, the relative position of the component includes determining a relative angle of the tread as shown in the image relative to a showing in the image of the fixed component of the aircraft landing gear, the part of the aircraft separate to the aircraft landing gear, or the part of a landing gear bay of the aircraft, or relative to the imaging device; and the determining the steering angle of the aircraft landing gear is based on at least in part on the relative angle of the tread.

9. The method according to claim 1, further comprising determining the relative position of the component of the aircraft landing gear by applying a Hough transform to the edge obtained by the edge detection.

10. The method according claim 1, further comprising applying a filter to greyscale the image.

11. The method according to claim 1, further comprising applying gamma correction to the image.

12. The method according to claim 1, further comprising applying a threshold to the image.

13. The method according to claim 1, wherein the component comprises a reference mark, and the determining the relative position of the component further comprises determining, based at least in part on the edge obtained by the edge detection, the relative position of the component using an image of the reference mark in the image.

14. An aircraft controller configured to:

obtain an image of an aircraft landing gear, wherein the image captured by an imaging device located on a part of an aircraft with a view of the aircraft landing gear;

perform edge detection on the image;

determine, based at least in part on an edge obtained by the edge detection, a relative position of a component of the aircraft landing gear in the image, wherein the relative position of the component of the aircraft landing gear in the image relative to a position of: a fixed component of the aircraft landing gear, a part of the aircraft separate to the aircraft landing gear or a part of a landing gear bay of the aircraft, or relative to the imaging device;

determine, based at least in part on the relative position of the component, the steering angle of the aircraft landing gear;

determine whether the steering angle is at a maximum steering angle, and in response to the determination that the steering angle is at the maximum steering angle, prevent increasing the steering angle while the steering angle is at the maximum steering angle.

15. An aircraft comprising the aircraft controller according to claim 14.

16. A system for determining a steering angle of an aircraft landing gear on an aircraft, the system comprising:

an imaging device located on a part of the aircraft with a view of the aircraft landing gear; and an aircraft controller configured to:

obtain an image of the aircraft landing gear from the at least one imaging device;

perform edge detection on the image;

determine, based at least in part on an edge obtained by the edge detection, a relative position of a component of the aircraft landing gear in the image, wherein the relative position of the component of the aircraft landing gear in the image relative to a position of a fixed component of the aircraft landing gear, a part of the aircraft separate to the aircraft landing gear or a part of a landing gear bay of the aircraft, or relative to the imaging device;

determine, based at least in part on the relative position of the component, the steering angle of the aircraft landing gear;

determine whether the steering angle is at a maximum steering angle, and in response to the determination that the steering angle is at the maximum steering angle, prevent increasing the steering angle while the steering angle is at the maximum steering angle.

17. The system according to claim 16, wherein the imaging device comprises a first imaging device and a second imaging device, wherein the first imaging device and the second imaging device are different types of imaging device.

18. The system according to claim 17, wherein the first imaging device comprises a camera and the second imaging device comprises a lidar sensor.

19. A method of identifying an aircraft steering angle, the method comprising:

obtaining an image of an aircraft landing gear assembly using an imaging device located on a part of an aircraft with a view of at least a portion of the aircraft landing gear assembly;

performing image processing on the image to determine an image feature, the image feature associated with a first aircraft component of the landing gear assembly;

identifying, based at least in part on the image feature, a position of the first component of the landing gear assembly relative to a second component of the landing gear assembly;

identifying, based at least in part on the identified position, the aircraft steering angle;

determining whether the steering angle is at a maximum steering angle, and in response to the determination that the steering angle is at the maximum steering angle, preventing increasing the steering angle while the steering angle is at the maximum steering angle.

20. A non-transitory computer-readable storage medium storing instructions that, when executed by an aircraft controller, cause the aircraft controller to carry out the method according to claim 1.

21. The method of claim 1, wherein the performing edge detection on the image includes performing a Canny, Sobel, Prewitt or Roberts edge detection.

* * * * *